(12) United States Patent
Gerhardt et al.

(10) Patent No.: US 10,787,033 B2
(45) Date of Patent: *Sep. 29, 2020

(54) FREEWHEEL HUB

(71) Applicant: Christianson Systems, Inc., Blomkest, MN (US)

(72) Inventors: Jim Gerhardt, St. Augusta, MN (US); Shannon Hansen, Bird Island, MN (US)

(73) Assignee: CHRISTIANSON SYSTEMS, INC., Blomkest, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 15/608,386

(22) Filed: May 30, 2017

(65) Prior Publication Data
US 2017/0334242 A1    Nov. 23, 2017

Related U.S. Application Data

(63) Continuation of application No. 14/798,977, filed on Jul. 14, 2015, now Pat. No. 9,662,938, which is a continuation of application No. 13/763,848, filed on Feb. 11, 2013, now Pat. No. 9,102,197.

(51) Int. Cl.
  *B60B 27/04* (2006.01)
  *F16D 41/28* (2006.01)
  *B60B 27/02* (2006.01)
  *F16D 41/24* (2006.01)

(52) U.S. Cl.
  CPC ......... *B60B 27/047* (2013.01); *B60B 27/023* (2013.01); *F16D 41/28* (2013.01); *B60B 2900/1212* (2013.01); *B60B 2900/212* (2013.01); *B60B 2900/321* (2013.01); *B60B 2900/325* (2013.01); *F16D 41/24* (2013.01); *Y10T 29/49535* (2015.01)

(58) Field of Classification Search
  CPC .............................................. B60B 2900/1212
  See application file for complete search history.

(56) References Cited

U.S. PATENT DOCUMENTS

| | | |
|---|---|---|
| 1,608,141 A | 11/1926 | Shekerjian |
| 2,211,548 A | 8/1940 | Schwinn |
| 3,301,095 A | 1/1967 | Dotter |
| 3,546,971 A | 12/1970 | Schwerdhofer |
| 3,696,690 A | 10/1972 | Schwerdhofer |
| 3,726,371 A | 4/1973 | Versoy |

(Continued)

FOREIGN PATENT DOCUMENTS

JP    WO2009/031569    * 12/2009

OTHER PUBLICATIONS

Machine language translation of WO2009/031569 from NTN.*
GMN Paul Muller Industrie GmbH & Co. KG, *Sprag-Type Freewheel-Clutches*, Catalogue No. 9050, Jul. 2006, . 28 pages.

*Primary Examiner* — Mark A Manley
(74) *Attorney, Agent, or Firm* — Merchant & Gould P.C.

(57) ABSTRACT

The present disclosure provides a bicycle hub that provides improved drive line efficiency and bike-to-rider torque feedback. The drive line efficiencies are due to lower rolling resistance resulting from a novel bearing and sprag clutch configuration, a lightweight design, and immediate torque transfer from the cassette drive to the hub body. The bike-to-rider feedback has been improved as the torque transfer is smooth, predictable, and immediate.

16 Claims, 9 Drawing Sheets

(56) References Cited

U.S. PATENT DOCUMENTS

| | | | |
|---|---|---|---|
| 3,865,220 | A | 2/1975 | Thompson, Jr. |
| 3,984,129 | A | 10/1976 | Hege |
| 4,170,369 | A | 10/1979 | Strutman |
| 4,480,698 | A | 11/1984 | Reeves |
| 4,501,575 | A | 2/1985 | Lapeyre |
| 4,615,423 | A | 10/1986 | Klauke et al. |
| 4,711,331 | A | 12/1987 | Hoffmann |
| 5,485,905 | A | 1/1996 | Rader, III |
| 5,515,957 | A | 5/1996 | McConaghy |
| 5,690,202 | A | 11/1997 | Myers |
| 5,964,332 | A | 10/1999 | King |
| 6,591,956 | B1 | 7/2003 | Neugent |
| 7,108,097 | B1 | 9/2006 | Bolton et al. |
| 7,207,584 | B2 | 4/2007 | Forderhase |
| 7,328,766 | B2 | 2/2008 | Christini et al. |
| 7,487,854 | B2 | 2/2009 | Christini et al. |
| 7,854,305 | B2 | 12/2010 | Smetana et al. |
| 7,874,955 | B2 | 1/2011 | Patterson |
| 8,033,945 | B2 | 10/2011 | Patterson |
| 8,056,693 | B2 | 11/2011 | Christini et al. |
| 9,102,197 | B2 | 8/2015 | Gerhardt et al. |
| 9,662,938 | B2 * | 5/2017 | Gerhardt ................ F16D 41/28 |
| 2003/0101786 | A1 | 6/2003 | Rader, III |
| 2005/0029071 | A1 | 2/2005 | Hsu |
| 2007/0199788 | A1 | 8/2007 | Chen |

* cited by examiner

FREEWHEEL HUB

RELATED APPLICATIONS

This application is a continuation of application Ser. No. 14/798,977, filed Jul. 14, 2015, issued as U.S. Pat. No. 9,662,938 on May 30, 2017; which is a continuation of application Ser. No. 13/763,848 filed Feb. 11, 2013, issued as U.S. Pat. No. 9,102,197 on Aug. 11, 2015, both entire disclosures of which are incorporated herein by reference.

TECHNICAL FIELD

A freewheeling bicycle hub including a sprag type clutch configuration.

BACKGROUND

Freewheeling bicycle hubs are generally known. For example, U.S. Pat. No. 2,211,548 to Frank W. Schwinn issued on Jun. 24, 1940 is directed to a freewheeling bicycle hub configuration. Freewheeling bicycle hubs are configured to enable rotation of the pedals to drive the rotation of the wheels while also allowing the wheels to rotate independent of the rotation of the pedals. This functionality enables the pedals of the bike to be held stationary while the wheels rotate as the bike coasts. Freewheeling bicycle hubs are also commonly referred to as coaster hubs.

SUMMARY

The present disclosure provides a bicycle hub that provides improved drive line efficiency and bike-to-rider torque feedback. The drive line efficiencies are due to lower rolling resistance resulting from a novel bearing and sprag clutch configuration, a lightweight design, and immediate torque transfer from the cassette drive to the hub body. The bike-to-rider feedback has been improved as the torque transfer is smooth, predictable, and immediate.

DETAILED DESCRIPTION

Figure 1:
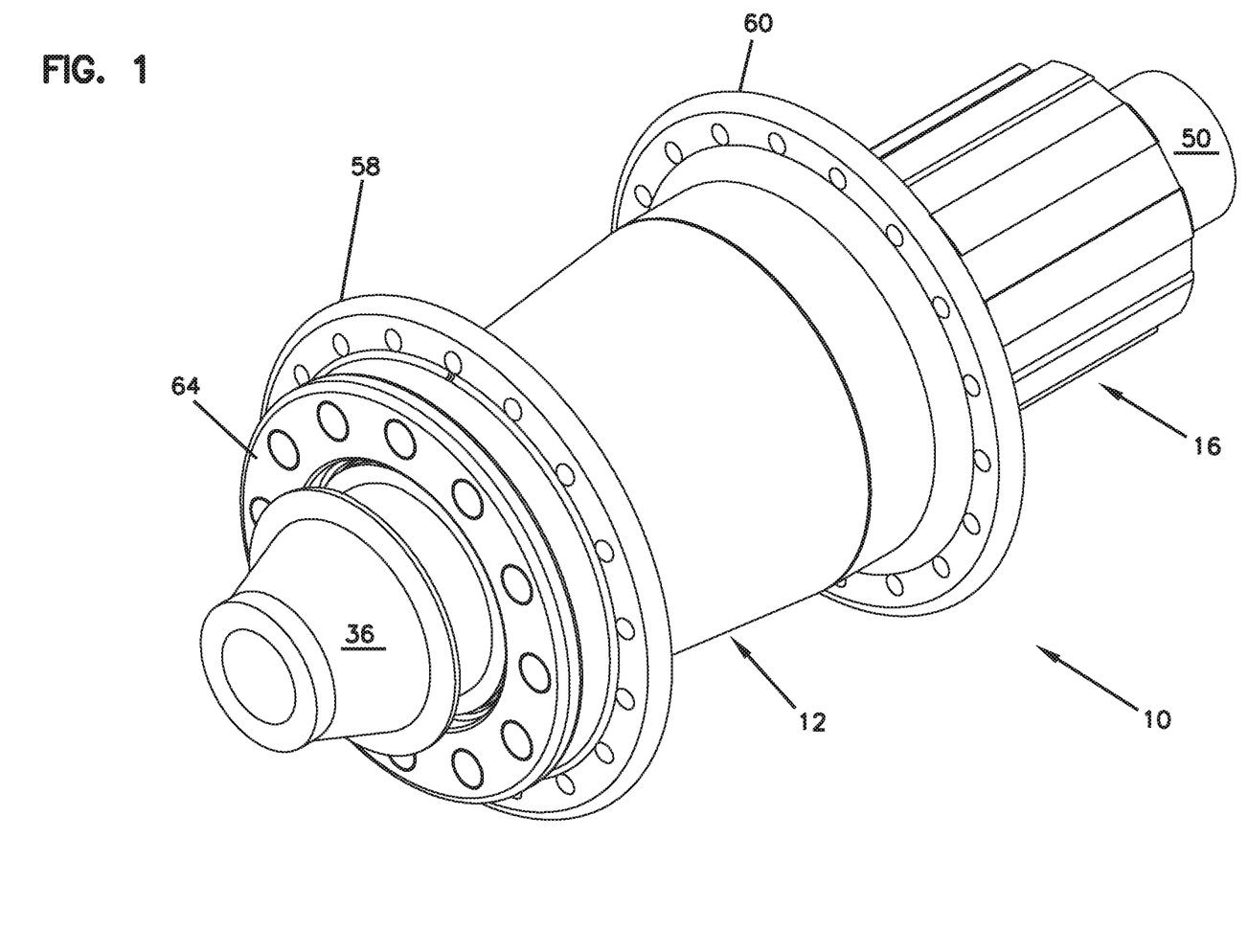
FIG. 1 is an isometric view of a hub according to the principles of the present disclosure.
Figure 2:
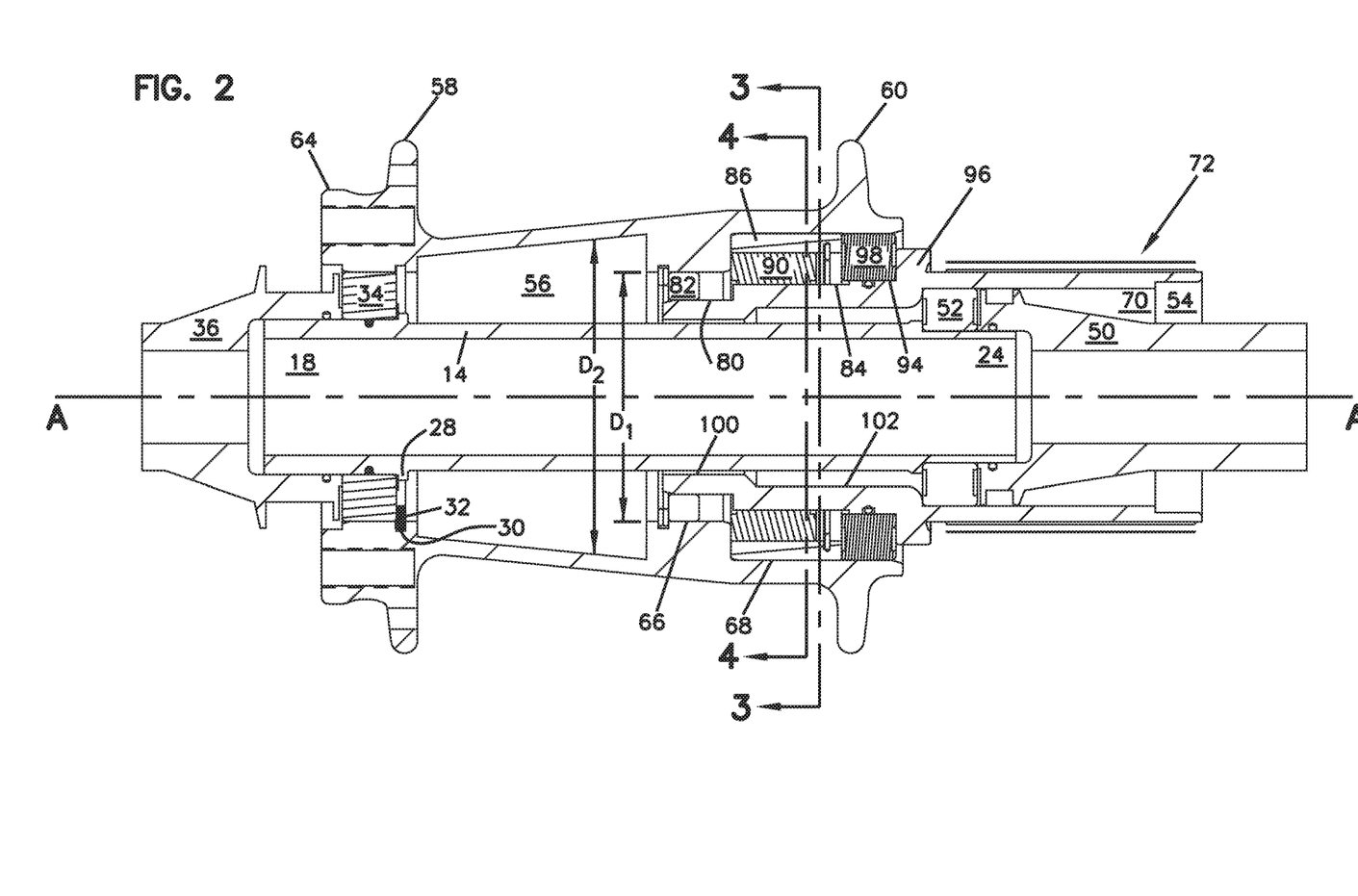
FIG. 2 is a longitudinal cross-sectional view of the hub of FIG. 1.
Figure 3:
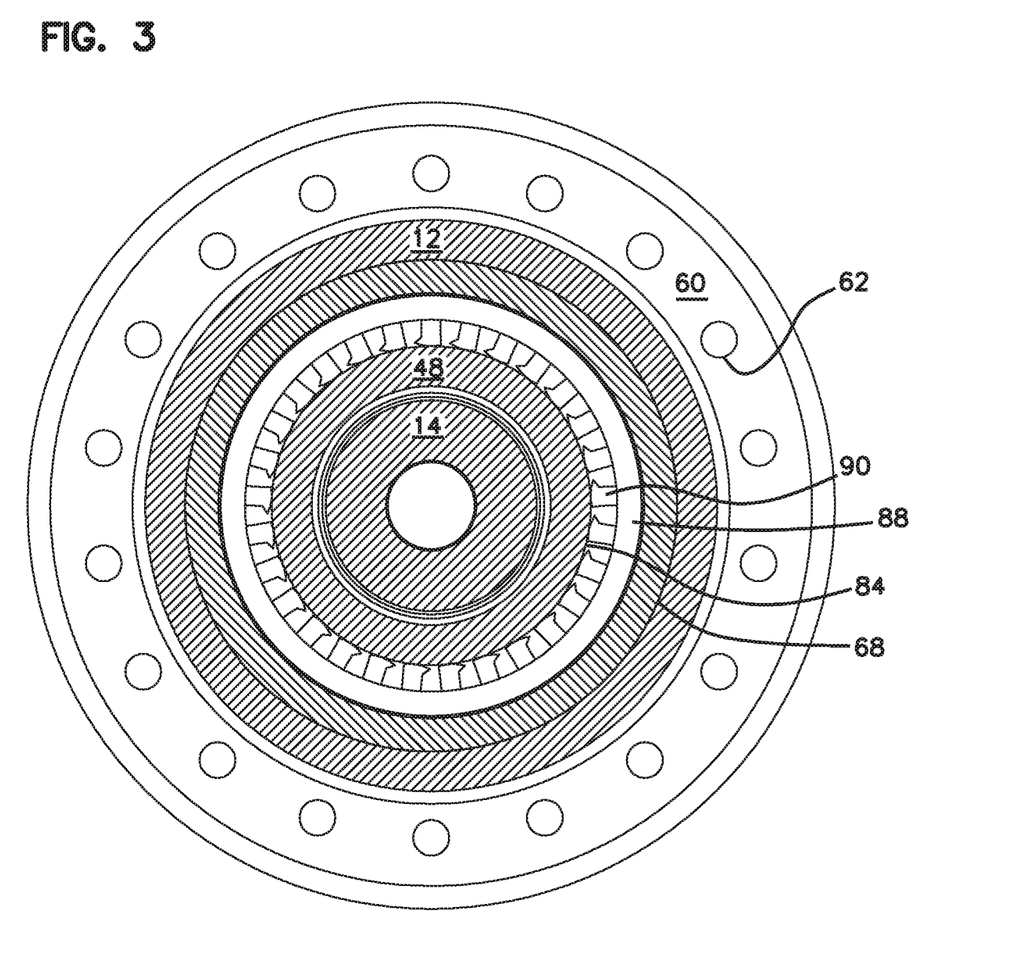
FIG. 3 is a cross-sectional view of the hub along line 3-3 of FIG. 2.
Figure 4:
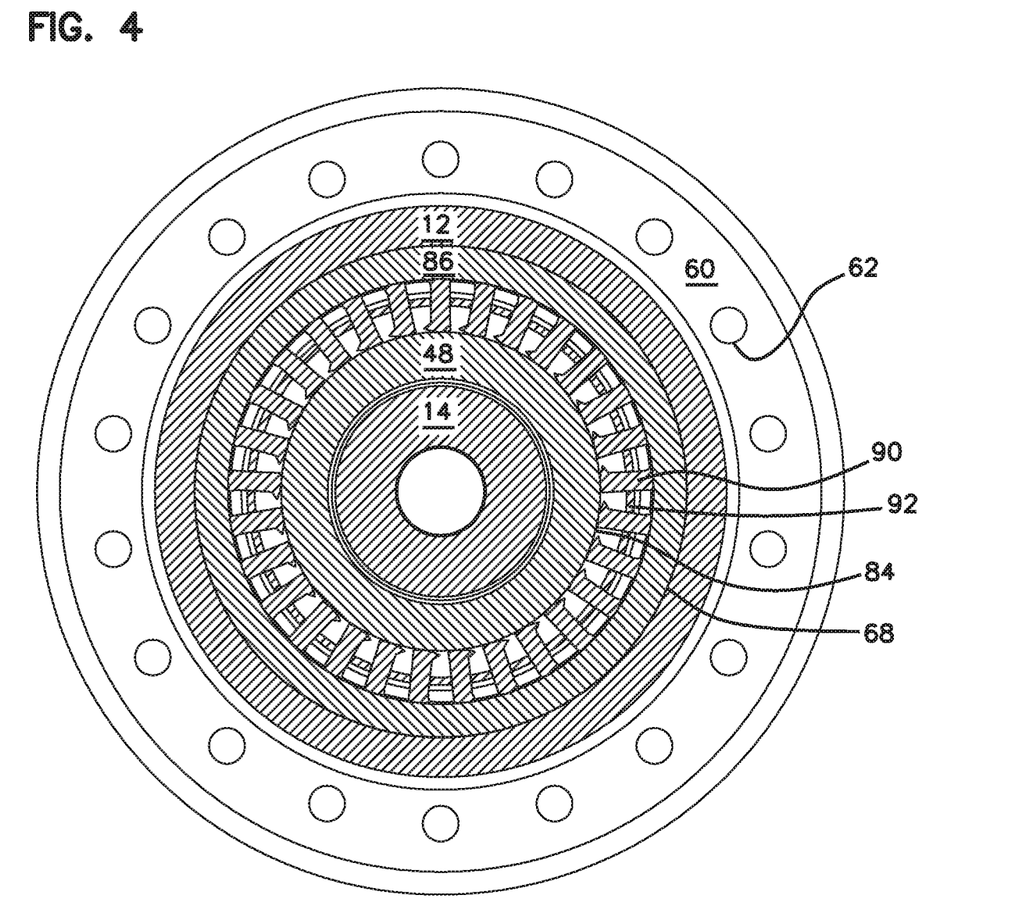
FIG. 4 is a cross-sectional view of the hub along line 4-4 of FIG. 2.
Figure 5:
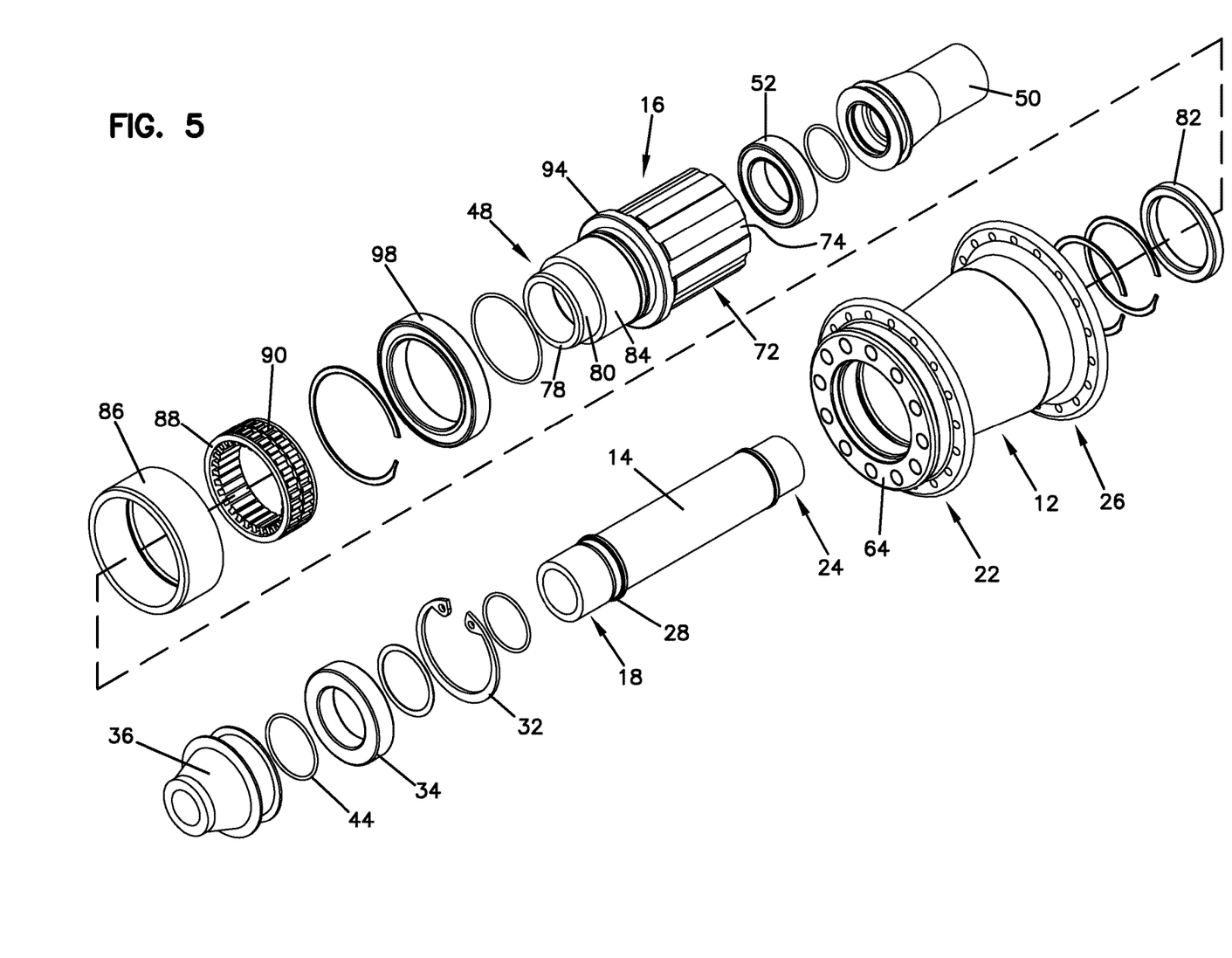
FIG. 5 is an exploded assembly view of the hub of FIG. 1.

Referring to FIG. 1, a first embodiment of a hub according to the present disclosure is shown. In the depicted embodiment, the hub 10 includes a hub body 12, an axle 14, and cassette driver 16. In the depicted embodiment, the hub 10 is configured to freewheel. In other words, a cassette driver 16 rotates with the hub body 12 when the wheel is driven by the cassette driver 16 and the cassette driver 16 rotates relative to the hub body 12 when the wheel is coasting (rotating and not being driven).

Referring to FIGS. 2-5 and 9, the configuration of hub 10 is described in greater detail. In the depicted embodiment the hub 10 is configured for use with multiple speed bicycles (e.g., road bikes, mountain bikes, etc.) that utilize an external cassette driven by a chain. In the depicted embodiment the axle 14 is co-axially arranged within the hub body 12. In particular, the axle 14 extends through the hub body 12. The axle 14 includes a first end portion 18 that is positioned within the first end portion 22 of the hub body 12 and a second opposed end portion 24 that includes a portion that extend outwardly from the second end 26 of the hub body 12.

In the depicted embodiment, the first end portion 18 of the axle includes a shoulder 28. The hub body 12 includes a snap ring groove 30 aligned with the shoulder 28 in a radial direction such that a snap ring 32 and the shoulder 28 cooperatively limit the axial movement of a bearing set 34 in a direction toward the second end 26 of the hub body 12. The bearing set 34 engages an exterior surface of the axle and an interior surface of the internal cavity 56 of the hub body 12. In the depicted embodiment a spacer 36 covers the first end 38 of the axle. In the depicted embodiment a first o-ring 44 seals the interface between the spacer 36 and the axle, and a second o-ring 46 seals the interface between the bearing set 34 and the axle.

In the depicted embodiment, the second end portion 24 of the axle 14 is co-axially arranged within both the hub body 12 and drive end portion 48 of the cassette driver 16. In the depicted embodiment a portion of the second end portion 24 of the axle 14 extends into the driven end of the cassette driver and is connected to a spacer 50. In the depicted embodiment, the second end of portion 24 of the axle 14 interfaces with the cassette driver 16 via bearing set 52. The spacer 50, which is secured to the axle 14, interfaces with the cassette driver 16 via bearing set 54.

In the depicted embodiment, the hub body 12 includes a one-piece construction. The hub body 12 is machined from a single piece of aluminum (e.g., aluminum 7075TC51). The hub body 12 defines a longitudinal rotational axis A-A. The hub body 12 includes an internal cavity 56 that receives the axle 14 as well as the drive end portion 48 of the cassette driver 16. The hub body 12 includes a first radially extending flange 58 located at the first end portion 22 of the hub body 12, and a second radially extending flange 60 located at the second end of the hub body. Each of the radially extending flanges 58, 60 includes a plurality of spaced apart through apertures 62 that are configured to secure spokes. Adjacent the first radially extending flange 58 is a disk brake mount flange 64 configured to support a disk of a disk brake system. The external cylindrical body of the hub body 12 tapers from the second flange 60 towards the first flange 58. In other words, the exterior diameter of the hub body 12 adjacent the second flange 60 is greater than the exterior diameter of the hub body 12 adjacent the first flange 58.

In the depicted embodiment, the wall thickness of the hub body 12 is greater in the portion that radially overlaps the drive end portion 48 of the cassette driver 16 as compared to the portion that does not overlap the cassette driver 16. In the depicted embodiment the internal cavity 56 of the second end portion 26 of the hub body defines two internal cylindrical surfaces. A first cylindrical surface 66 is defined as being a distance D1 from the longitudinal rotational axis A-A, and a second cylindrical surface 68 is defined as being a distance D2 from the longitudinal rotational axis A-A. In the depicted embodiment D2 is greater than D1 and the first surface 66 is closer to the first end portion 22 of the hub body 12 than the second cylindrical surface 68. In the depicted embodiment, the hub body is machined in a process whereby the hub body is not removed from a spindle until both the first and second cylindrical surfaces 66, 68 are drilled.

In the depicted embodiment the cassette driver 16 includes an internal cavity 70 that extends from a drive end portion 48 to an opposed driven end portion 72. The cavity receives the axle 14, which extends into the drive end portion 48 of the cassette driver 16. The cassette driver 16 defines a longitudinal axis of rotation that is coaxial and coincident with the axis of rotation A-A of the hub body 12. In the depicted embodiment, the driven end 72 includes a cylindrical body with a plurality of axially extending grooves 74, which are configured to engage cassette comprised of sprockets and spacers.

In the depicted embodiment the drive end 48 of the cassette driver 16 includes a plurality of coaxial cylindrical surfaces that are positioned within the hub body 12 opposite the internal cylindrical surfaces 66, 68 of the hub body 12. In the depicted embodiment an annular snap ring groove 76 is located in the first cylindrical surface 66 of the inner cavity 56 of the hub body 12 opposite an end face 78 of the drive end portion 48 of the cassette driver 16. A first cylindrical surface 80 extends from the end face 78 of the cassette driver towards the driven end 72 of the cassette driver 16. The first cylindrical surface 80 of the drive end 48 together with the first cylindrical surface 66 defines a first annular cavity that receives bearing set 82 that interfaces between the drive end 48 of the cassette driver 16 and the hub body 12.

In the depicted embodiment a second cylindrical surface 84 having a larger diameter than the first cylindrical surface 80 extends from the first cylindrical surface 80 towards the driven end 72 of the cassette driver 16. The second cylindrical surface 84 of the drive end 48 together with the second cylindrical surface 68 defines an annular cavity that receives a sprag clutch assembly. In the depicted embodiment the surface finish of the second cylindrical surface 84 is less than or equal to Rz of 2.5 micrometers and has a HRC hardness of 60. In the depicted embodiment, the second cylindrical surface 84 has a diameter of greater than 22 mm (e.g., 29 mm). In the depicted embodiment the second cylindrical surface is constructed of a 5210 bearing race type steel. In the depicted embodiment the drive end portion 48 of the drive cassette 16 is precision ground and subsequently hardened, thereby enabling it to act as a force bearing surface for the sprags.

In the depicted embodiment the sprag clutch assembly includes a sprag sleeve 86, a sprag retaining cage 88, sprags 90, and a tensioning band 92. In the depicted embodiment the surface finish of the inside surface of the sprag sleeve is less than or equal to Rz of 2.5 micrometers and the inside surface of the sprag sleeve has a HRC hardness of 60. In the depicted embodiment, the sprag sleeve 86 has a diameter of less than 40 mm (e.g., 37 mm). The sprag sleeve has a height dimension that is greater than the height dimension of the sprag retaining cage 88. The sprag sleeve 86 includes a snap ring groove that receives a snap ring that limits the axial movement of the sprag cage 88 in the axial direction towards the driven end 72 of the cassette driver. Axial movement of the sprag cage 88 in the direction towards the first cylindrical surface 80 of the driven end 48 of the cassette driver 16 is limited by contact with the bearing set 82. In the depicted embodiment the sprag sleeve is constructed of a 5210 bearing race type steel which is pressed fit/interference fit into the second cylindrical surface 68 of the hub body 12. In the depicted embodiment the sprag sleeve 86 overlaps the second flange 60 in the radial direction. The construction of the sprag sleeve 86 and the hub body 12 cooperatively provide the structural stiffness needed for reliable and long lasting operation of the hub despite the strong radial forces that are generated by the sprags 90. The sprags and sprag cages used in the depicted embodiment are currently available commercially from GMN Paul Müller Industrie GmbH & Co. KG.

In the depicted embodiment a third cylindrical surface 94 extends coaxially from the second cylindrical surface 84 towards the driven end 72 of the cassette driver 16. The third cylindrical surface 94 has a diameter that is greater than the diameter of the second cylindrical surface 84. A shoulder 96 is provided on the cassette driver 16 between the third cylindrical surface 94 and the driven end 72 of the cassette driver 16. The third cylindrical surface 94 of the drive end 48 of the cassette driver 16 together with the second cylindrical surface 68 defines a first annular cavity that receives bearing set 98 that interfaces between the drive end 48 of the cassette driver 16 and the hub body 12. The shoulder 96 limits axial movement of the bearing set 98 in the direction towards the driven end 72 of the cassette driver 16. An end face of the sprag sleeve 86 limits axial movement of the bearing set 98 on the axial direction towards the first cylindrical surface 80 of the drive end 48 of the cassette driver 16. In the depicted embodiment the third cylindrical surface 94 includes an annular o-ring groove configured to receive an o-ring that seals the interface between the third cylindrical surface 94 and the bearing set 98.

In the depicted embodiment the, the internal cavity of the drive end 48 of the of the cassette driver includes a first cylindrical surface 100 defined by a first diameter that is greater than the diameter of the axle, and a second cylindrical surface 102 defined by a second diameter that is greater than the first diameter, the second cylindrical surface being closer to the driven end of the cassette driver than the first cylindrical surface. The configuration results in further weight savings and strength of the cassette driver and facilitates precision manufacturing thereof.

In the depicted embodiment the configuration results in a high performance hub as it has the strength and durability to withstand intense use while also being lightweight and smooth in operation. The hub body 12 is constructed of lightweight, relatively softer aluminum material and it is designed so that it can be manufactured with high precision as the above-referenced cylindrical surfaces 66, 68 can be machined without detaching the hub body 12 from the chuck that holds the part during machining. The hard and robust sprag sleeve 86 is pressed into the softer aluminum. The pressing process creates a tight interference fit between the sprag sleeve 86 and cylindrical surface 68. This interface allows the hub body 12 to work together to resist the radial forces generated by the sprags. The sprag sleeve 86 provides the hardened surface that interfaces with the sprags and also provides additional structural strength to the hub. The hub of the depicted embodiment does not require rebuilding and can operate in extreme environments including environments as cold as −50 degrees Fahrenheit.

In the depicted embodiment the sprag cage moves with the cassette driver 16. The tensioning member (e.g., spring) on the sprag cage biases the individual sprags against the cylindrical surface 84 of the cassette driver 16 resulting in the sprag cage being essentially tension mounted to cassette driver 16. The internal ends of the sprags contact the second external surface 84 of the cassette driver and are biased radially outwardly against a spring and extend radially slightly beyond the periphery edge of the sprag cage. This configuration results in little and light contact between the sprags and the sprag sleeve 86 during coasting, which results in a very low friction configuration as the clutch configuration is disengaged during coasting. The non-drive forces applied between the hub body 12 and the cassette driver 16 are transferred through the bearing sets 82, 98 that sandwich the sprag clutch assembly.

In the depicted embodiment as soon as the driven end 72 is rotated in the drive direction at a rotational speed that exceeds the rotational speed in the drive direction of the hub body 12, the sprags engage and lock against the sprag sleeve 86 and transfer torque from the cassette driver 16 to the hub body 12. In the depicted embodiment the sprag clutch assembly transfers torque to drive the hub forward. However, the sprag clutch assembly is not relied on as a bearing set support the relative rotation between the cassette driver 16 and the hub body 12. This configuration results in a clutch configuration that immediately engages when the driven end is driven. For example, in the depicted configuration the driven end cannot be rotated relative to the hub body in the drive direction more than a small amount before it fully engages and transfers torque from the cassette driver 16 to the hub body 12, thereby causing the hub body to rotate with the cassette driver 16. The amount of relative rotation in the drive direction, commonly referred to as play or slop, can be less than five degrees (e.g., less than two degrees, less than one degree, or one half of a degree).

Figure 6:
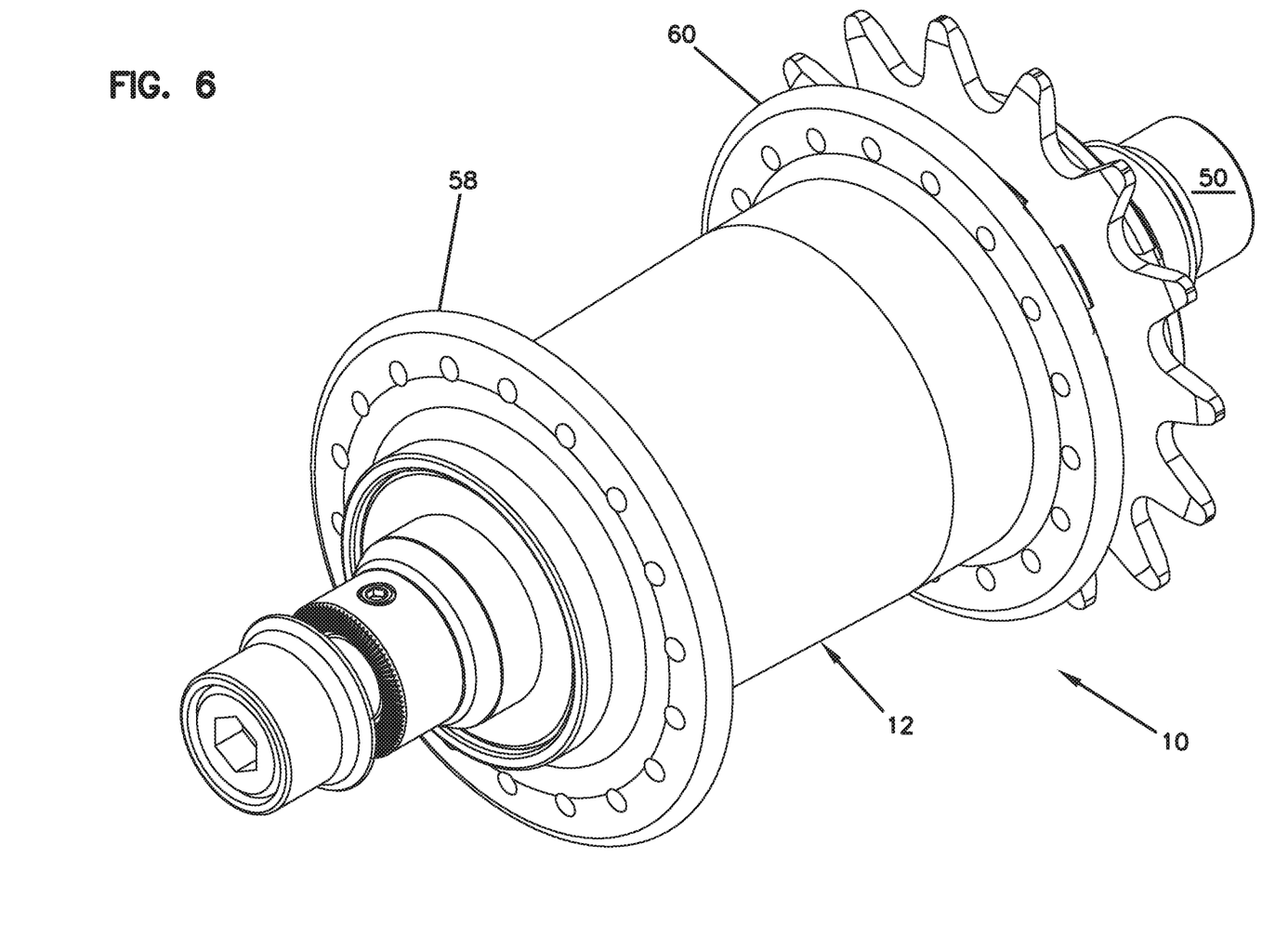
FIG. 6 is an isometric view of an alternative embodiment of the hub of FIG. 1.
Figure 7:
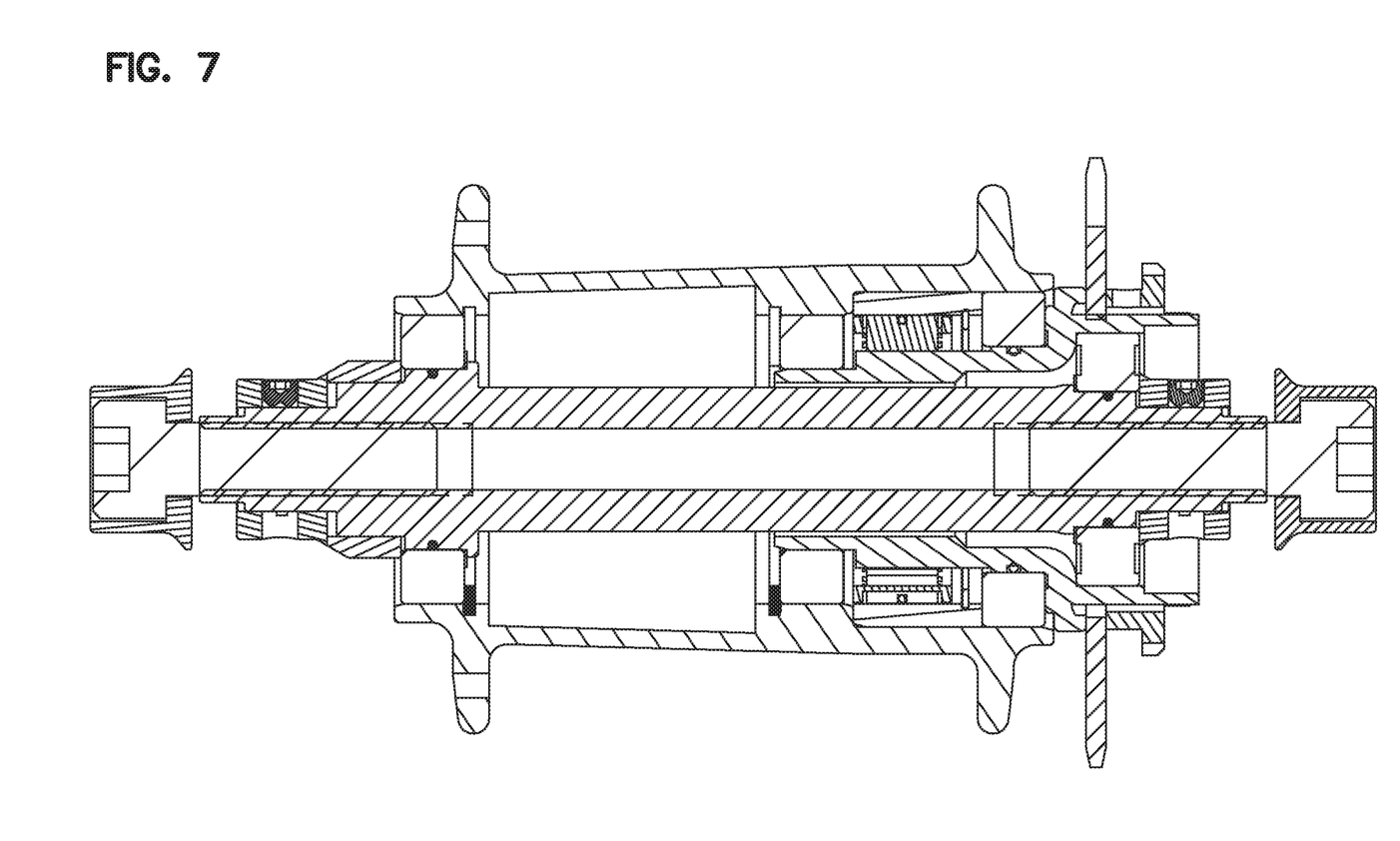
FIG. 7 is a longitudinal cross-sectional view of the hub of FIG. 6.
Figure 8:
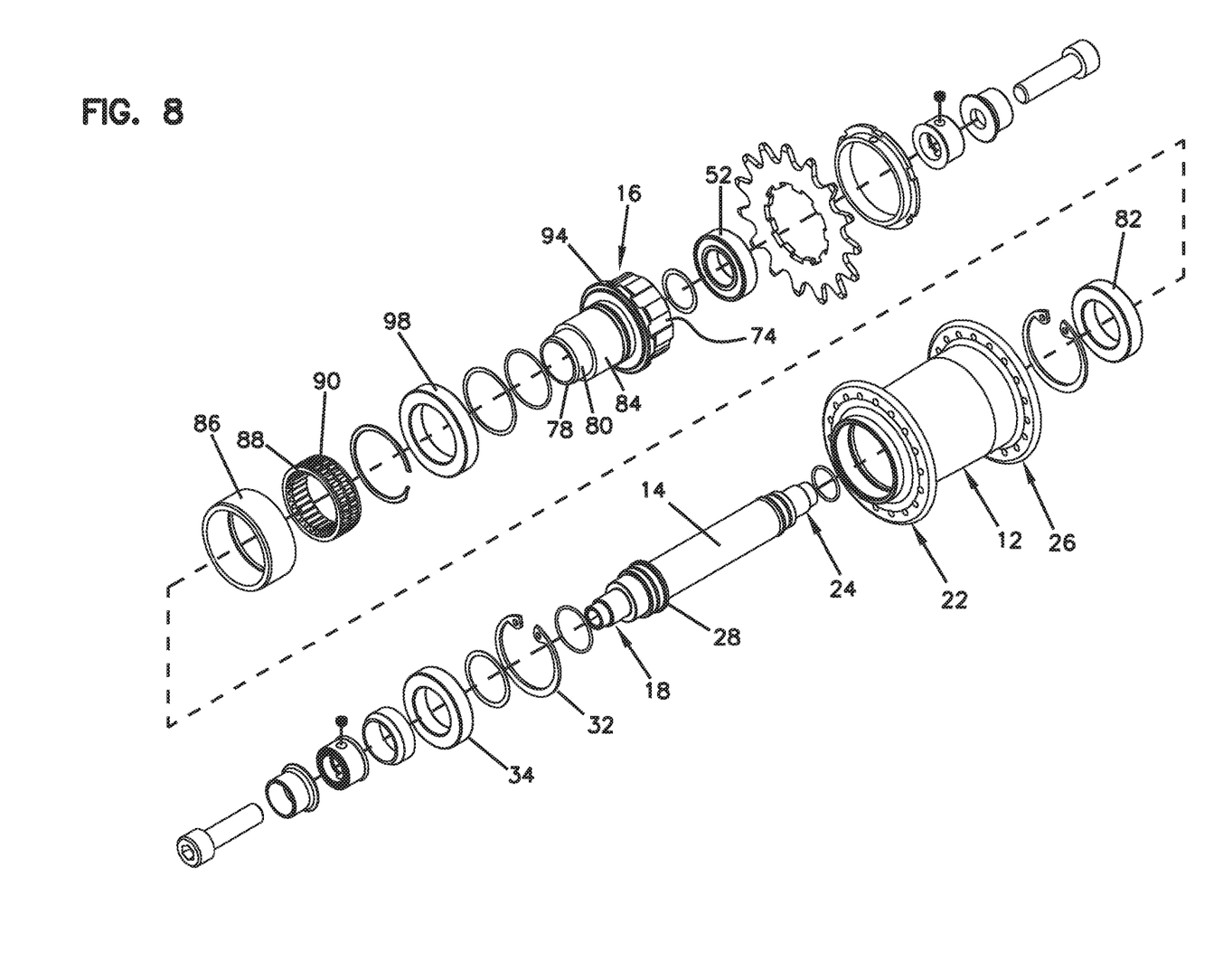
FIG. 8 is an exploded assembly view of the hub of FIG. 6.
Figure 9:
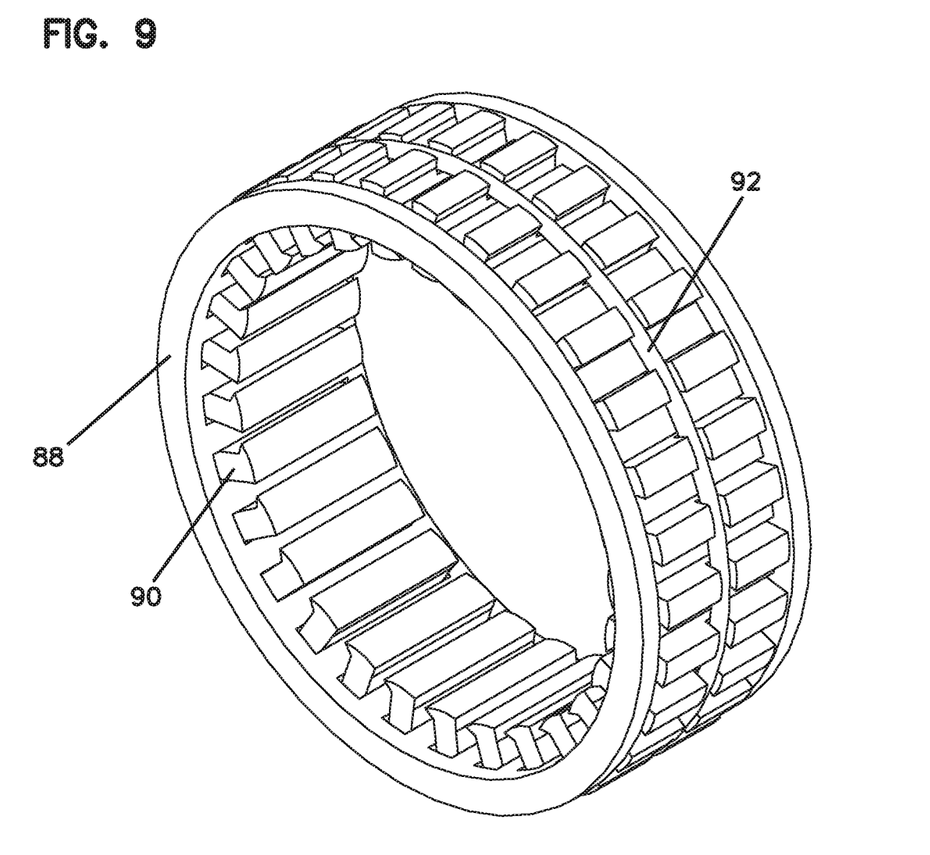
FIG. 9 is an enlarged view of a portion of FIG. 5.

Referring to FIGS. 6-8, an alternative embodiment of the hub according to the present disclosure is shown. In the depicted embodiment the hub is configured for a single speed bicycle such as a bmx bike. One of ordinary skill in the art would recognized that this embodiment includes many of the same features discussed above, therefore this embodiment will not be described separately detail herein.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A bicycle hub comprising:
    a hub body including an annular internal cavity that extends from a first hub end portion terminating in a first end of the hub body to a second hub end portion terminating in a second end of the hub body, the second end having a larger diameter than the first end, the second end including a radially extending flange;
    a driver including a first end portion terminating in a first end and a second end portion terminating in a second end, the first end portion being received within the second hub end portion of the hub body and stopping short of the first end of the hub body, the first end portion including a stepped outer profile, the first end portion including:
        a first bearing interfacing cylindrical surface located adjacent a distal end of the first end of the driver having a first diameter;
        a first sprag interfacing cylindrical surface that is coaxially arranged with the annular internal cavity of the hub body located adjacent the first bearing interfacing cylindrical surface and including a second diameter that is larger than the first diameter; and
        a second bearing interfacing cylindrical surface located adjacent the first sprag interfacing cylindrical surface;
    a support assembly configured to enable relative rotation between the hub body and the driver;
    a cylindrical sprag sleeve positioned within that is press fitted into the annular internal cavity of the hub body, the sprag sleeve defining a second sprag interfacing cylindrical surface; and
    a plurality of sprags located between the first sprag interfacing cylindrical surface and the second sprag interfacing cylindrical surface.

2. The bicycle hub of claim 1, wherein the plurality of sprags rotate with the driver while sliding relative to the cylindrical sprag sleeve while the hub is in a freewheeling state.

3. The bicycle hub of claim 1, wherein the support assembly is a bearing assembly.

4. The bicycle hub of claim 1, wherein the support assembly includes:
    a first bearing set interfacing between an axle that extends through the hub body and the first end of the hub body;
    a second bearing set interfacing between the axle and an internal surface of the driver to facilitate relative rotation between the axle and the driver;
    a third bearing set located between the first bearing interfacing cylindrical surface and the hub body; and
    a fourth bearing set located between the second bearing interfacing cylindrical surface and the hub body.

5. The bicycle hub of claim 4, wherein at least one of the first, second, third, and fourth bearing sets are ball bearings.

6. The bicycle hub of claim 1, wherein the first end of the driver and the annular internal cavity of the hub body cooperatively define a first annular cavity on a first side of the plurality of sprags and a second annular cavity on a second opposed side of the plurality of sprags, wherein the annular cavities are configured to receive bearing sets that interface between the hub body and the driver and facilitate relative rotation therebetween.

7. The bicycle hub of claim 6, wherein the bearing sets on either side of the plurality of sprags are positioned between a first bearing set that interfaces between the hub body and an axle and a second bearing set that interfaces between the driver and the axle.

8. The bicycle hub of claim 1, wherein space between the first sprag interfacing cylindrical surface and the second sprag interfacing cylindrical surface is maintained constant and the sprag's engagement delay is less than one degree.

9. The bicycle hub of claim 1, further comprising an annular sprag cage including the plurality of sprags, wherein the annular sprag cage is configured to rotate with the driver and rotate relative to the hub body.

10. The bicycle hub of claim 1, further comprising an axle that extends through the hub body and the driver.

11. The bicycle hub of claim 1, wherein the plurality of the sprags is biased against the first sprag interfacing cylindrical surface and radially aligned with the cylindrical sprag sleeve.

12. The bicycle hub of claim 1, wherein the second end of the driver includes a shaft configured to drive the rotation of a freehub body.

13. The bicycle hub of claim 1, wherein the driver further includes a cylindrical body configured to engage with at least one sprocket.

14. A bicycle hub comprising:
    a hub body including an annular internal cavity that extends from a first hub end portion terminating in a first end of the hub body to a second hub end portion terminating in a second end of the hub body, the second end having a larger diameter than the first end, the second end including a radially extending flange;

a driver including a first end portion terminating in a first end and a second end portion terminating in a second end, the first end portion being received within the second hub end portion of the hub body and stopping short of the first end of the hub body, the first end portion including:

a first bearing interfacing cylindrical surface located adjacent a distal end of the first end of the driver;

a first sprag interfacing cylindrical surface that is coaxially arranged with the annular internal cavity of the hub body located adjacent the first bearing interfacing cylindrical surface; and a second bearing interfacing cylindrical surface located adjacent the first sprag interfacing cylindrical surface;

a support assembly configured to enable relative rotation between the hub body and the driver;

a cylindrical sprag sleeve positioned within that is press fitted into the annular internal cavity of the hub body, the sprag sleeve defining a second sprag interfacing cylindrical surface; and a plurality of sprags located between the first sprag interfacing cylindrical surface and the second sprag interfacing cylindrical surface;

a bearing set located between the first bearing interfacing cylindrical surface and the hub body; and a bearing set located between the second bearing interfacing cylindrical surface and the hub body;

a bearing set interfacing between an axle that extends through the hub body and the first end of the hub body; and a bearing set interfacing between the axle and an internal surface of the driver to facilitate relative rotation between the axle and the driver.

15. The bicycle hub of claim 14, wherein the first end portion of the driver includes a stepped outer profile, wherein the first bearing interfacing cylindrical surface has a first diameter, wherein the first sprag interfacing cylindrical surface includes a second diameter that is larger than the first diameter.

16. The bicycle hub of claim 14, wherein the second end of the driver includes a cylindrical body configured to engage with at least one sprocket.

* * * * *